United States Patent
Hsieh et al.

(10) Patent No.: US 10,817,635 B2
(45) Date of Patent: *Oct. 27, 2020

(54) MULTIPLE PATTERNING METHOD FOR SEMICONDUCTOR DEVICES

(71) Applicant: Taiwan Semiconductor Manufacturing Co., Ltd., Hsin-Chu (TW)

(72) Inventors: Ken-Hsien Hsieh, Taipei (TW); Chih-Ming Lai, Hsinchu (TW); Ru-Gun Liu, Hsinchu County (TW); Wen-Chun Huang, Tainan (TW); Wen-Li Cheng, Taipei (TW); Pai-Wei Wang, Hsin-Chu (TW)

(73) Assignee: Taiwan Semiconductor Manufacturing Co., Ltd., Hsin-Chu (TW)

(*) Notice: Subject to any disclaimer, the term of this patent is extended or adjusted under 35 U.S.C. 154(b) by 0 days.

This patent is subject to a terminal disclaimer.

(21) Appl. No.: 16/133,110

(22) Filed: Sep. 17, 2018

(65) Prior Publication Data

US 2019/0042685 A1    Feb. 7, 2019

Related U.S. Application Data

(63) Continuation of application No. 15/179,754, filed on Jun. 10, 2016, now Pat. No. 10,078,718.

(Continued)

(51) Int. Cl.
*G06F 30/39* (2020.01)
*G03F 1/36* (2012.01)
(Continued)

(52) U.S. Cl.
CPC .............. *G06F 30/39* (2020.01); *G03F 1/36* (2013.01); *G03F 1/70* (2013.01); *G06F 2119/18* (2020.01)

(58) Field of Classification Search
CPC ............ G06F 17/5081; G06F 2217/06; G06F 17/5068; G06F 2217/12; G06F 2119/18;
(Continued)

(56) References Cited

U.S. PATENT DOCUMENTS

| 6,678,876 B2 | 1/2004 | Stevens et al. |
| 8,601,416 B2 | 12/2013 | Kuo et al. |

(Continued)

FOREIGN PATENT DOCUMENTS

| CN | 102110182 | 6/2011 |
| TW | 396379 | 7/2000 |

(Continued)

OTHER PUBLICATIONS

O. V. Borodin and A. Rasaud, "A Sufficient Condition for Planar Graphs to be 3-Colorable," Journal of Combinatorial Theory Series B 88 (2003), pp. 17-27.

(Continued)

*Primary Examiner* — Vuthe Siek
(74) *Attorney, Agent, or Firm* — Haynes and Boone, LLP

(57) ABSTRACT

Disclosed is a method of fabricating an integrated circuit (IC) using a multiple (N>2) patterning technique. The method provides a layout of the IC having a set of IC features. The method further includes deriving a graph from the layout, the graph having vertices connected by edges, the vertices representing the IC features, and the edges representing spacing between the IC features. The method further includes selecting vertices, wherein the selected vertices are not directly connected by an edge, and share at least one neighboring vertex that is connected by N edges. The method further includes using a computerized IC tool to merge the selected vertices, thereby reducing a number of edges connecting the neighboring vertex to be below N. The (Continued)

method further includes removing a portion of the vertices that are connected by less than N edges.

20 Claims, 11 Drawing Sheets

Related U.S. Application Data

(60) Provisional application No. 62/273,365, filed on Dec. 30, 2015.

(51) Int. Cl.
*G03F 1/70* (2012.01)
*G06F 119/18* (2020.01)
*H01L 27/02* (2006.01)

(58) Field of Classification Search
CPC ...... G06F 30/398; G06F 30/39; G06F 119/18; G03F 1/36; G03F 1/70; Y02P 90/265; H01L 27/0207; H01L 27/02
See application file for complete search history.

(56) References Cited

U.S. PATENT DOCUMENTS

| | | | |
|---|---|---|---|
| 8,683,392 B2 | 3/2014 | Hsieh et al. | |
| 8,762,900 B2 | 6/2014 | Shin et al. | |
| 8,775,993 B2 | 7/2014 | Huang et al. | |
| 8,887,116 B2 | 11/2014 | Ho et al. | |
| 2014/0101623 A1 | 4/2014 | Chen et al. | |
| 2014/0201692 A1 | 7/2014 | Chen et al. | |
| 2014/0237435 A1 | 8/2014 | Chen et al. | |
| 2014/0237436 A1 | 8/2014 | Li et al. | |
| 2014/0282293 A1* | 9/2014 | Lin .................... | G06F 17/5081 716/52 |
| 2014/0282337 A1 | 9/2014 | Yuh et al. | |
| 2014/0304670 A1 | 10/2014 | Su et al. | |
| 2014/0310675 A1 | 10/2014 | Liu et al. | |
| 2014/0325464 A1 | 10/2014 | Hsu et al. | |
| 2015/0242561 A1 | 8/2015 | Sharma et al. | |
| 2015/0363541 A1* | 12/2015 | Lin .................... | G06F 17/5081 716/52 |
| 2017/0193147 A1 | 7/2017 | Hsieh et al. | |

FOREIGN PATENT DOCUMENTS

| | | |
|---|---|---|
| TW | 567528 | 12/2003 |
| TW | I412947 | 10/2013 |

OTHER PUBLICATIONS

M. R. Garey and D. S. Johnson, "Some Simplified NP-Complete Problems," Massachusetts Institute of Technology Cambridge, Massachusetts, pp. 47-63.

* cited by examiner

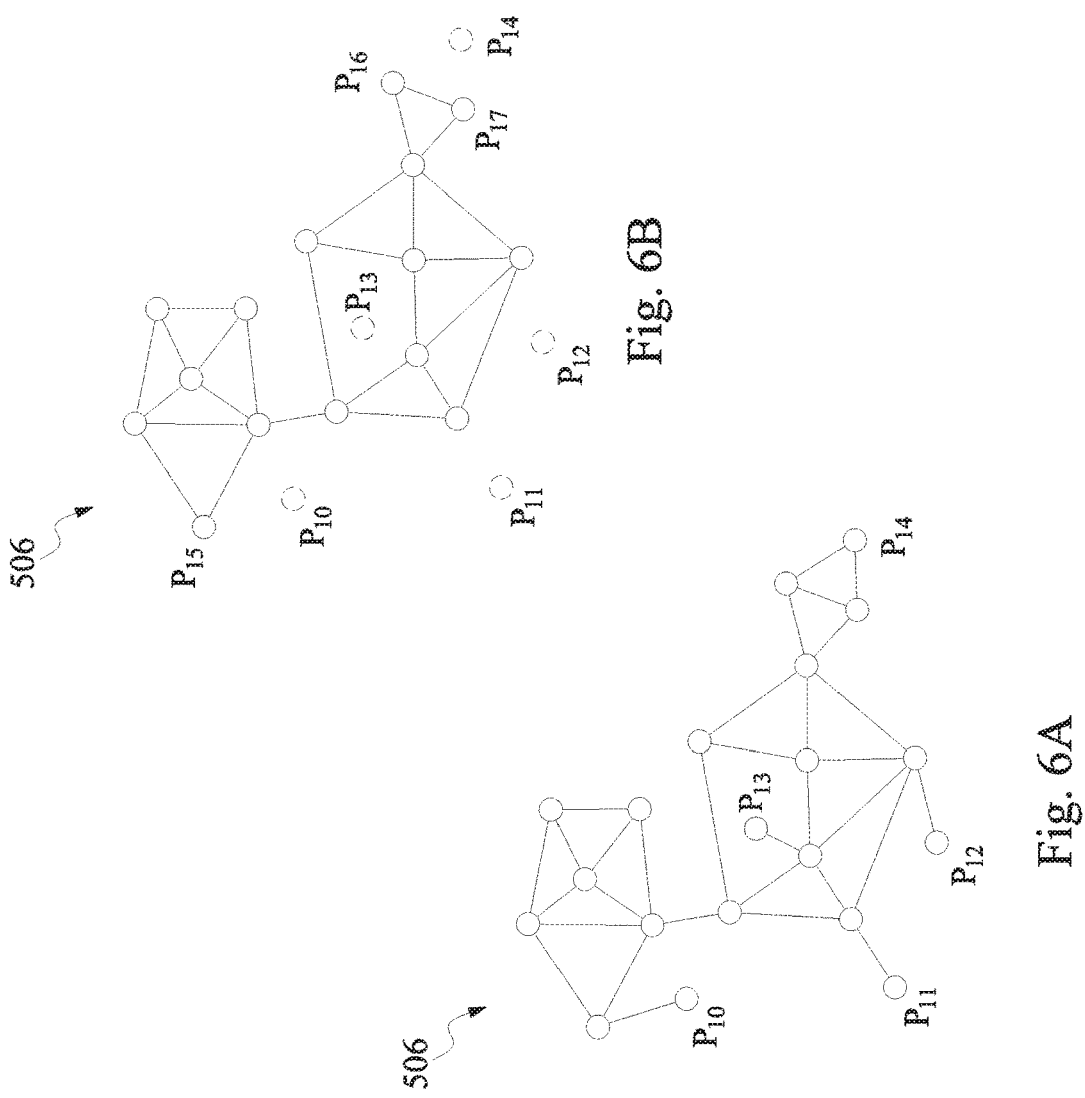

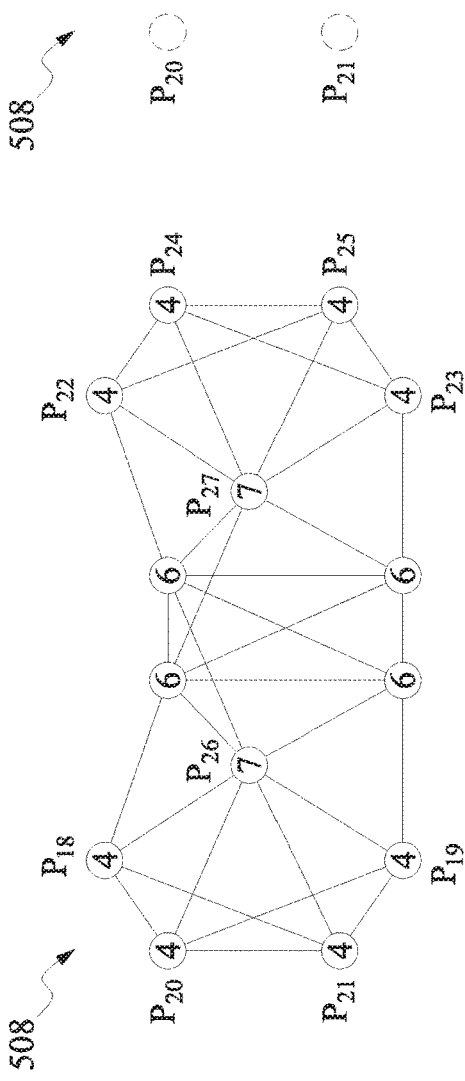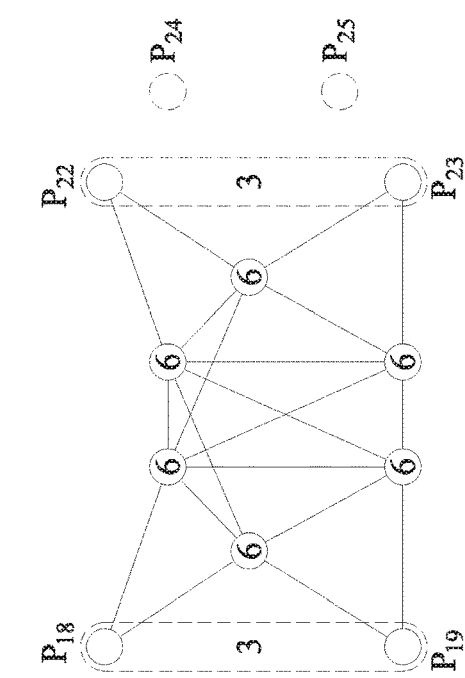
Fig. 7A
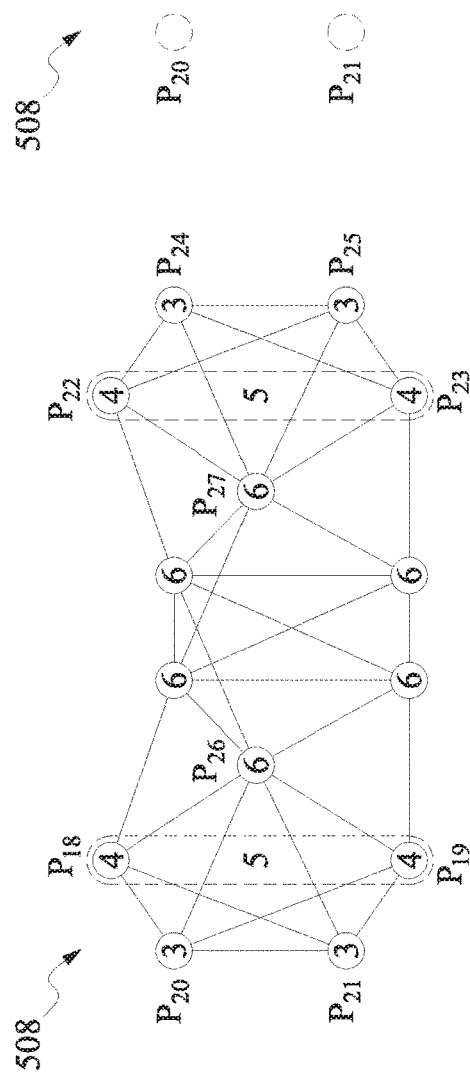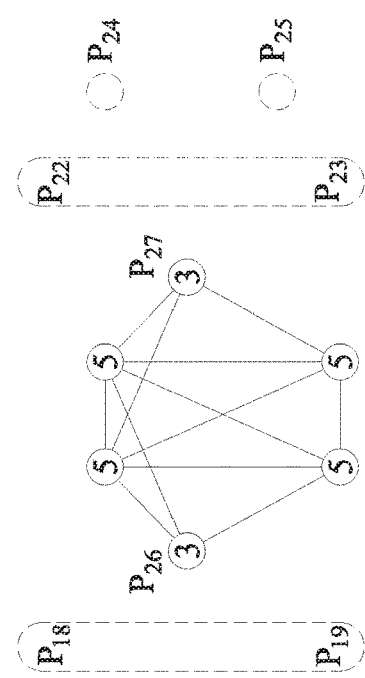
Fig. 7B
Fig. 7C
Fig. 7D

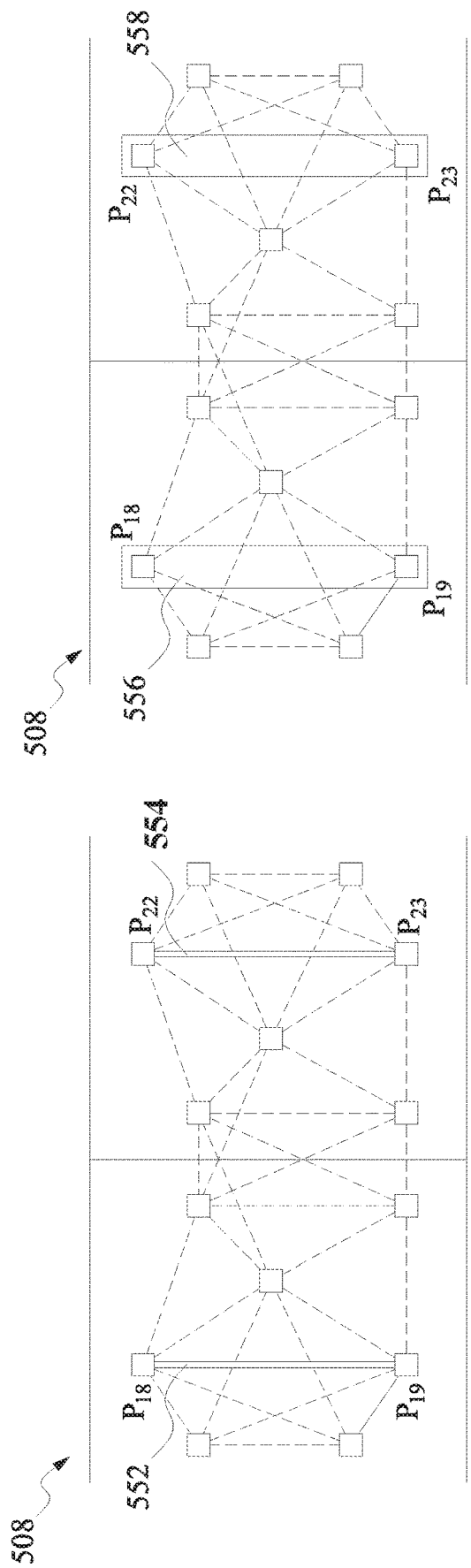

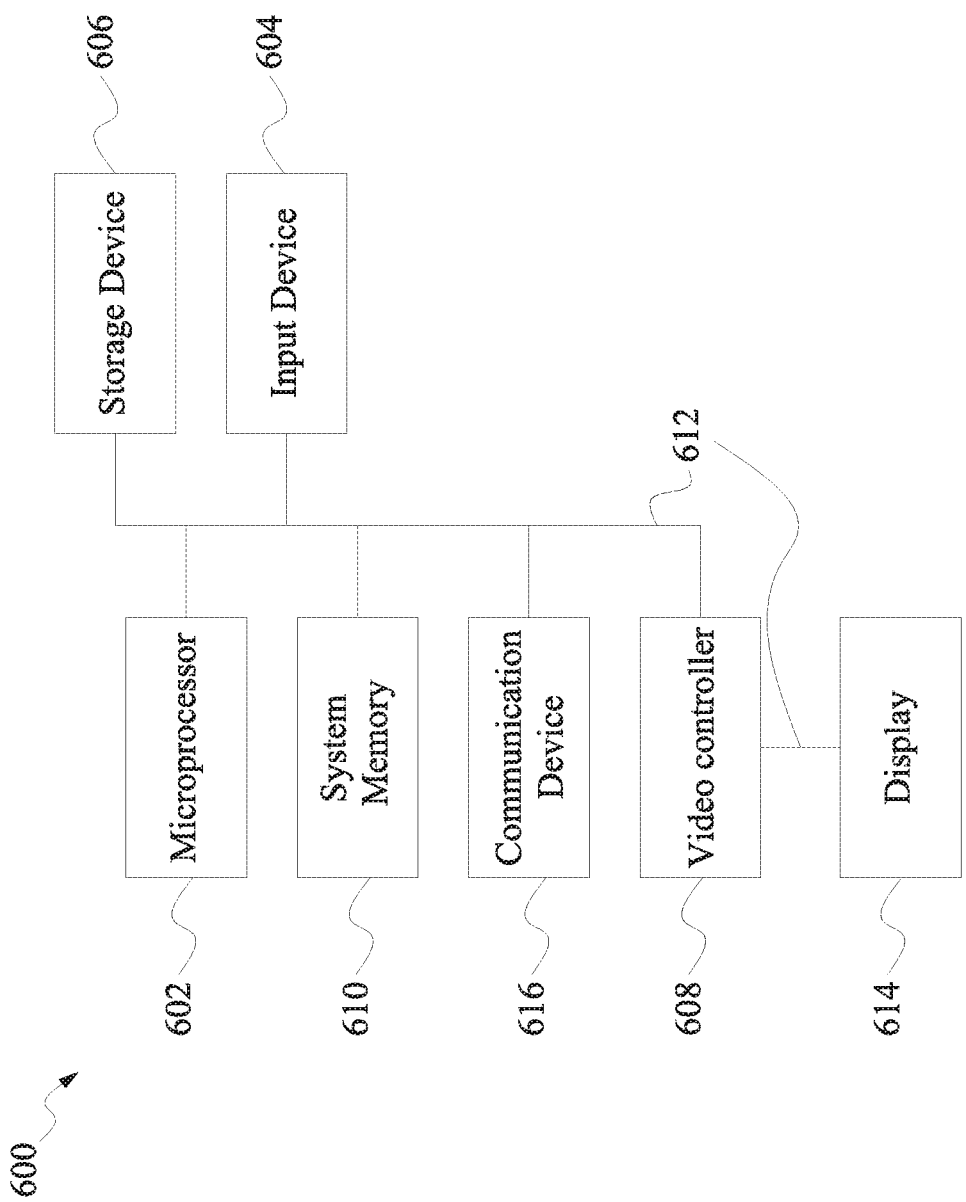

MULTIPLE PATTERNING METHOD FOR SEMICONDUCTOR DEVICES

This application is a continuation of U.S. patent application Ser. No. 15/179,754, filed Jun. 10, 2016 and entitled "Multiple Patterning Method for Semiconductor Devices," which claims the benefit of U.S. Provisional Application Ser. No. 62/273,365, filed Dec. 30, 2015 and entitled "Multiple Patterning Method for Semiconductor Devices," the entire disclosure of each of which is herein incorporated by reference.

BACKGROUND

The semiconductor integrated circuit (IC) industry has experienced rapid growth. In the course of IC evolution, functional density (i.e., the number of interconnected devices per chip area) has generally increased while geometry size (i.e., the smallest component (or line) that can be created using a fabrication process) has decreased. This scaling down process generally provides benefits by increasing production efficiency and lowering associated costs. Such scaling down has also increased the complexity of processing and manufacturing ICs and, for these advances to be realized, similar developments in IC manufacturing are needed.

For example, as the geometry sizes shrink, it generally becomes difficult for conventional photolithography processes to form semiconductor features having these small geometry sizes. One approach to this issue uses a double patterning (DP) method. A typical DP method decomposes an IC layout into two subsets and fabricates a photomask for each subset. A wafer is patterned with the two photomasks in two lithography processes. Images of the two lithography processes overlay with one another to collectively produce a denser image on the wafer. However, as the geometry sizes continue shrinking, even DP methods are not enough for meeting pattern density requirements in some instances.

One alternative approach uses multiple patterning (MP) method where an IC layout is decomposed into N subsets (throughout the present disclosure, N is an integer greater than 2 unless otherwise specified). Correspondingly, at least N photomasks are fabricated to collectively image the IC layout onto a wafer. However, implementing an MP method for IC design and fabrication is challenging as the MP decomposition is analogous to the N-coloring problem in mathematics, which has been shown to be an NP-complete problem. Therefore, it is desirable to find a practical way of realizing MP methods for IC design and fabrication.

BRIEF DESCRIPTION OF THE DRAWINGS

The present disclosure is best understood from the following detailed description when read with the accompanying figures. It is emphasized that, in accordance with the standard practice in the industry, various features are not drawn to scale and are used for illustration purposes only. In fact, the dimensions of the various features may be arbitrarily increased or reduced for clarity of discussion.

FIGS. 6A, 6B, and 6C illustrate an exemplary graph being simplified during an MP method, in accordance with an embodiment.

FIGS. 7A, 7B, 7C, 7D, 7E, and 7F illustrate another exemplary graph being simplified during an MP method, in accordance with an embodiment.

FIGS. 8A, 8B, 8C, and 8D illustrate an exemplary graph (IC layout) with MP virtual indicators inserted, according to aspects of the present disclosure.

FIG. 9 illustrates a block diagram of a computerized IC tool for carrying out operations of the method of FIGS. 3A and 3B, in accordance with some embodiments.

DETAILED DESCRIPTION

Figure 1:
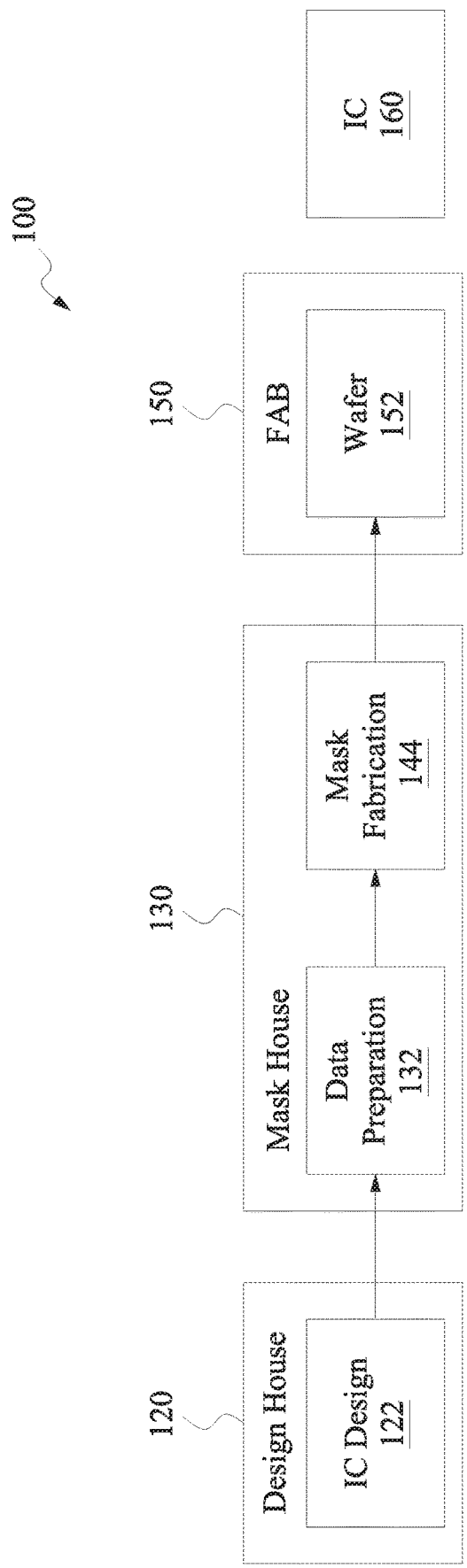
FIG. 1 is a simplified block diagram of an embodiment of an integrated circuit (IC) manufacturing system and an associated IC manufacturing flow, which may benefit from aspects of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

The present disclosure in various embodiments is generally related to IC design and fabrication. Particularly, the present disclosure is related to using multiple patterning (MP) methods for IC fabrication, wherein an IC layout is decomposed into N subsets for fabricating N photomasks, and N is an integer greater than two, such as three, four, and so on. Each of the N subsets appears in a photomask layer (or a masking layer) in a data file. As used herein, a photomask (or mask or reticle) is an apparatus used in photolithography, such as a plate having fused quartz substrate with a patterned chromium layer, while a photomask layer is a data file (such as a GDS file) used for fabricating a photomask. The N different photomasks are then used for collectively patterning a wafer. The MP method aims to extend the capability of conventional lithography tools to meet the demand of continued scaling down in semiconductor processes. The MP decomposition process is also referred to as a coloring process, since the patterns are assigned different colors in the IC layout to indicate the corresponding photomask layers where the patterns appear. The decomposition process may be performed at a design stage by design and/or layout engineers. Alternatively or additionally, it may be performed at later stages after the design stage, for example, by a foundry in a fabrication stage.

Decomposing an IC layout into N subsets is analogous to coloring a graph with N colors, which is generally NP-complete. For example, deciding whether a graph is 3-colorable has been shown to be NP-complete (See e.g., M. R. Garey et al. "*Some simplified NP-complete problems*," Proceedings of the sixth annual ACM symposium on Theory of computing, 1974, pp. 47-63). Accordingly, an object of the present disclosure is to find some practical ways of implementing MP methods in IC fabrication.

FIG. 1 is a simplified block diagram of an embodiment of an integrated circuit (IC) manufacturing system 100 and an IC manufacturing flow associated therewith, which may benefit from various aspects of the provided subject matter. The IC manufacturing system 100 includes a plurality of entities, such as a design house 120, a mask house 130, and an IC manufacturer 150 (i.e., a fab), that interact with one another in the design, development, and manufacturing cycles and/or services related to manufacturing an IC device 160. The plurality of entities are connected by a communications network, which may be a single network or a variety of different networks, such as an intranet and the Internet, and may include wired and/or wireless communication channels. Each entity may interact with other entities and may provide services to and/or receive services from the other entities. One or more of the design house 120, mask house 130, and IC manufacturer 150 may be owned by separate companies or by a single company, and may even coexist in a common facility and use common resources.

The design house (or design team) 120 generates an IC design layout 122. The IC design layout 122 includes various geometrical patterns (e.g., polygons) designed for the IC device 160. The geometrical patterns correspond to IC features in one or more semiconductor layers that make up the IC device 160. Exemplary IC features include active regions, gate electrodes, source and drain features, isolation features, metal lines, vias, and so on. The design house 120 implements appropriate design procedures to form the IC design layout 122. The design procedures may include logic design, physical design, place and route, and/or various design checking operations. The IC design layout 122 is presented in one or more data files having information of the geometrical patterns. For example, the IC design layout 122 can be expressed in a GDSII file format or DFII file format. A more detailed view of the design house 120 is illustrated as a flow chart in FIG. 2, according to various embodiments of the present disclosure.

Figure 2:
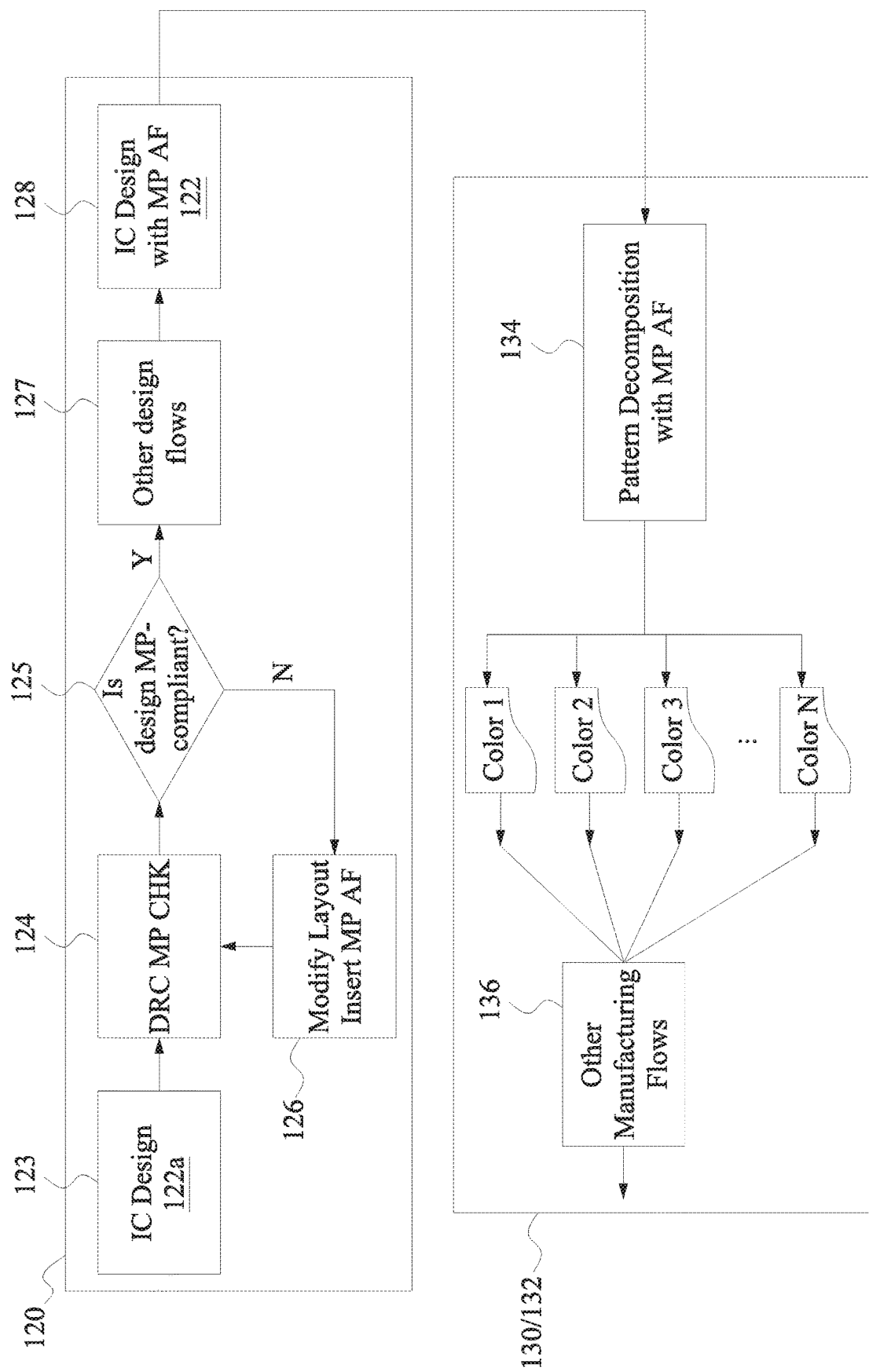
FIG. 2 is a more detailed view of some operations performed by the IC manufacturing system in FIG. 1, according to aspects of the present disclosure.

Referring to FIG. 2, in an embodiment, a design flow includes an operation 123 that creates an IC design layout 122a using geometrical patterns, such as polygons, to represent IC features. In the present embodiment, one or more layers of the IC design layout 122a have such a high pattern density that a multiple patterning (MP) technique is to be used during fabrication. The design flow proceeds to operations 124 and 125 that include a design rule checking (DRC). Particularly, the DRC checks whether the IC design layout 122a is suitable for MP decomposition (or whether the IC design layout 122a is MP compliant). In another word, the operations 124 and 125 check whether the IC design layout 122a is N-colorable.

In an embodiment, an IC design layout that passes the operations 124 and 125 are guaranteed to be MP compliant, but an IC design layout that fails the operations 124 and 125 may or may not be MP compliant because the N-colorability is generally an NP-complete problem. If the design layout 122a does not pass the operations 124 and 125, the design flow further includes an operation 126 that inserts MP assistant features (AF) or MP virtual indicators into the IC design layout 122a. The MP virtual indicators increase the IC design layout 122a's possibility of passing the operations 124 and 125. For example, the virtual indicators may designate that certain IC features are to be assigned to a single photomask layer. Aspects of the design house 120 related to checking N-colorability and inserting virtual indicators will be described in more details in later sections of the present disclosure.

If the IC design layout 122a, or the modified version thereof, passes the operations 124 and 125, the design flow performs other tasks in an operation 127 that may include layout versus schematic (LVS) checking, design for manufacturability (DFM) checking, and/or other tasks. Then, at operation 128, the IC design layout 122a, or a modified version thereof, is "taped out" as the IC design layout 122. In another word, it is presented in one or more data files (e.g., GDSII or DFII files) having information of the geometrical patterns. In a particular embodiment, the IC design layout 122 includes the virtual indicators inserted by the operation 126.

Referring back to FIG. 1, the mask house 130 uses the IC design layout 122 to manufacture a set of masks to be used for fabricating the various layers of the IC device 160 according to the IC design layout 122. The mask house 130 performs mask data preparation 132 and mask fabrication 144. The mask data preparation 132 translates the IC design layout 122 into a form that can be physically written by a mask writer. The mask fabrication 144 fabricates the set of masks (photomask or reticle).

FIG. 2 illustrates a more detailed view of an embodiment of the mask data preparation 132, according to aspect of the present disclosure. Referring to FIG. 2, in an embodiment, the mask data preparation 132 includes pattern decomposition for MP (operation 134), which utilizes the MP assistant features or virtual indicators in the IC design layout 122. Accordingly, a layout (e.g., one layer of an IC) is decomposed into N subsets (represented by Color 1, Color 2, Color 3, through Color N) and each subset is separately processed for mask fabrication 144. Aspects of the pattern decomposition 134 will be further described in later sections of the present disclosure. The mask data preparation 132 may further include other manufacturing flows (operation 138) such as optical proximity correction (OPC), off-axis illumination, sub-resolution assist features, other suitable techniques, or combinations thereof.

Referring back to FIG. 1, after mask data preparation 132 and during mask fabrication 144, a group of masks are fabricated based on the modified IC design layout 122. The group of masks includes the N masks for multiple patterning. For example, an electron-beam (e-beam) or a mechanism of multiple e-beams is used to form a pattern on a mask based on the modified IC design layout 122. The mask can be formed in various technologies such as binary masks and phase shifting masks. For example, a binary mask includes a transparent substrate (e.g., fused quartz) and an opaque material (e.g., chromium) coated on the substrate. The opaque material is patterned according to the modified IC design layout 122, thereby forming opaque regions and transparent regions on the binary mask. A radiation beam, such as an ultraviolet (UV) beam, is blocked by the opaque regions and transmits through the transparent regions, thereby transferring an image of the mask to a sensitive material layer (e.g., photoresist) coated on a wafer 152.

The IC manufacturer 150, such as a semiconductor foundry, uses the masks to fabricate the IC device 160 using, for example, photolithography processes. The IC manufacturer 150 may include front-end-of-line (FEOL) fabrication facility, and/or back-end-of-line (BEOL) fabrication facility. In the present embodiment, the semiconductor wafer 152 is fabricated using the masks to form the IC device 160 using multiple patterning methods. The semiconductor wafer 152 includes a silicon substrate or other proper substrate having material layers formed thereon. Other proper substrate materials include another suitable elementary semiconductor, such as diamond or germanium; a suitable compound semiconductor, such as silicon carbide, indium arsenide, or indium phosphide; or a suitable alloy semiconductor, such as silicon germanium carbide, gallium arsenic phosphide, or gallium indium phosphide. The semiconductor wafer 152 may further include various doped regions, dielectric features, and multilevel interconnects (formed at subsequent manufacturing steps). The masks may be used in a variety of processes. For example, the masks may be used in an ion implantation process to form various doped regions in the semiconductor wafer, in an etching process to form various etching regions in the semiconductor wafer, and/or in other suitable processes.

Figures 3A, 3B:
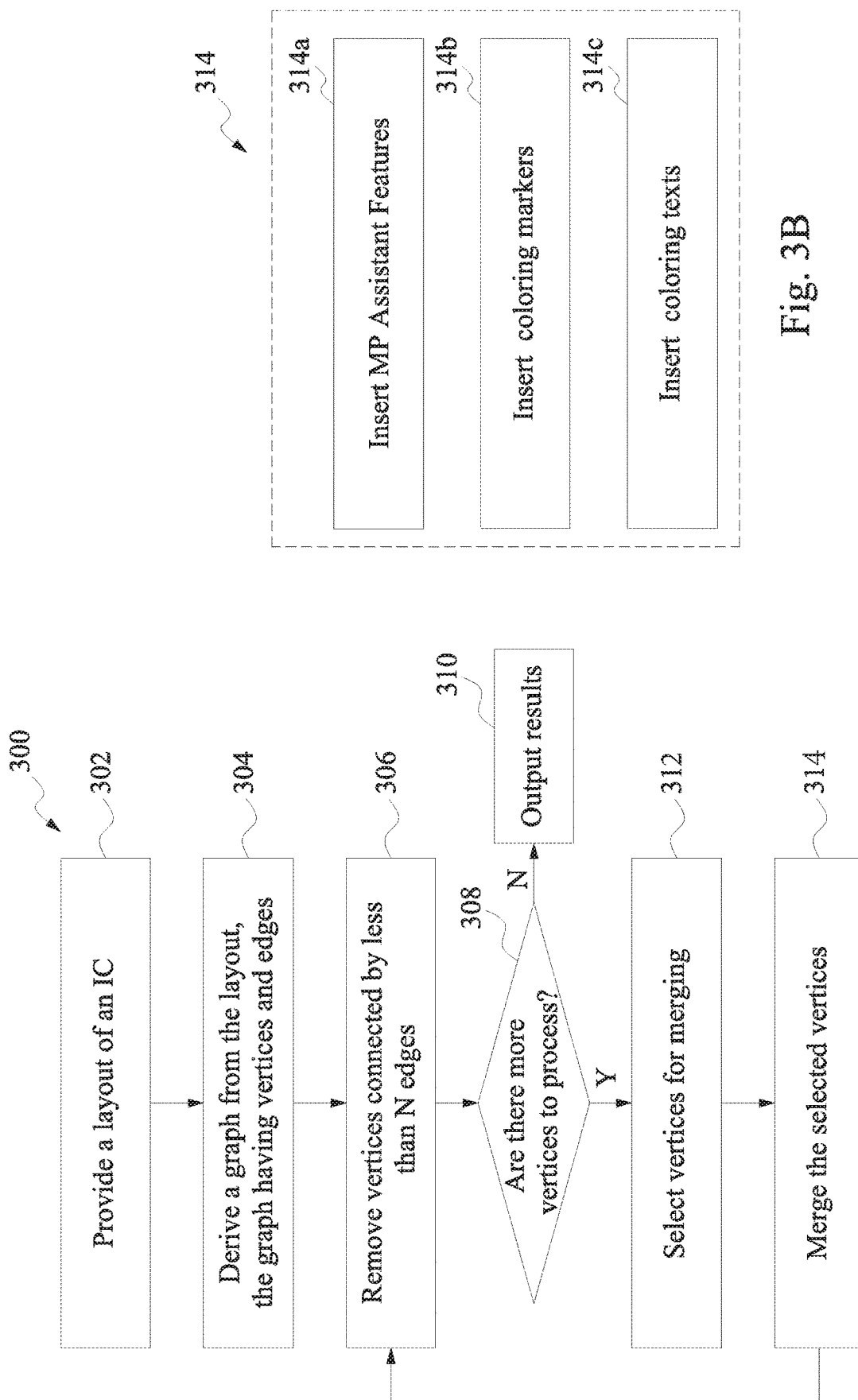
FIG. 3A shows a flow chart of a method for fabricating an IC according to various aspects of the present disclosure.
FIG. 3B shows embodiments of some operations of the method in FIG. 3A, in accordance with some embodiments.

FIGS. 3A and 3B are a high-level flowchart of a method 300, constructed according to various aspects of the present disclosure. In an embodiment, the method 300 is implemented in the design house 120 (FIG. 2) for checking MP compliance of an IC design layout. In another embodiment, the method 300 is implemented in the mask data preparation 132 (FIG. 2) for decomposing an IC design layout for MP mask fabrication. The method 300 is an example, and is not intended to limit the present disclosure beyond what is explicitly recited in the claims. Additional operations can be provided before, during, and after the method 300, and some operations described can be replaced, eliminated, or relocated for additional embodiments of the method. The method 300 in FIGS. 3A and 3B is a high-level overview, and details associated with each operation therein will be described in association with the subsequent figures (FIGS. 4A-8D) in the present disclosure.

Figure 4B:
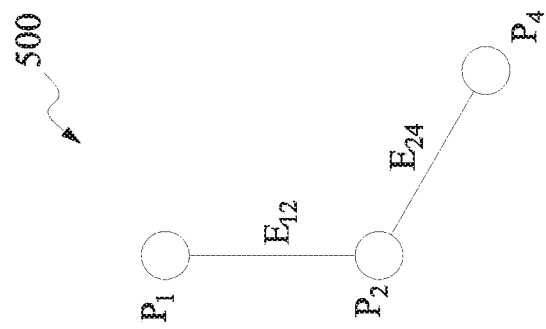
FIG. 4B illustrates a graph representing the IC layout of FIG. 4A, in accordance with an embodiment.
Figure 4A:
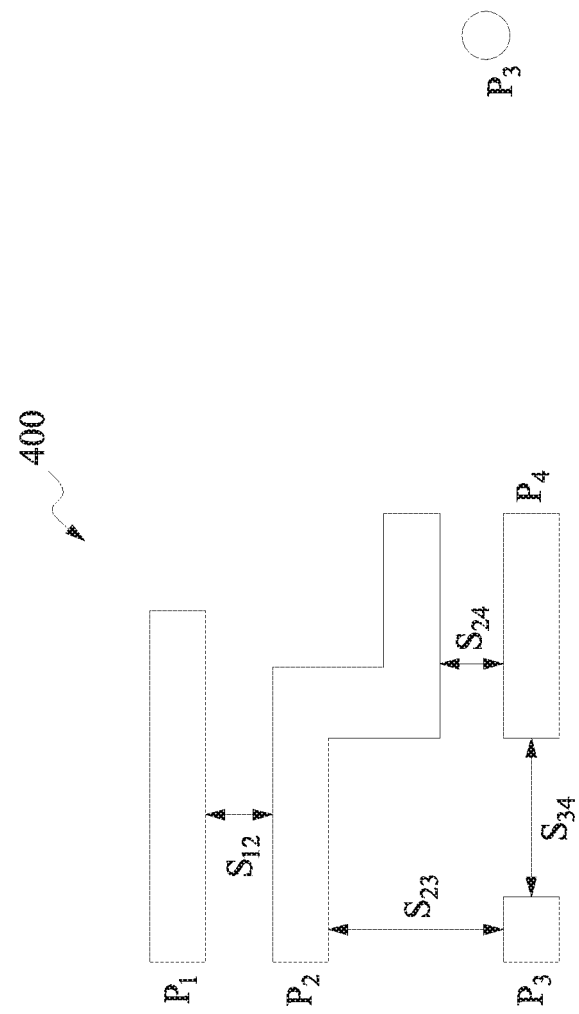
FIG. 4A illustrates an exemplary IC layout, according to aspects of the present disclosure.

Referring to FIG. 3A, at operation 302, the method 300 is provided with a layout of an IC. Referring to FIG. 4A, an exemplary layout 400 includes geometrical patterns (polygons in this embodiment) $P_1$, $P_2$, $P_3$, and $P_4$. Each of the patterns represent an IC feature such as an active region, a gate electrode, a source or drain feature, an isolation feature, a metal line, a via, or another suitable IC feature. The patterns are spaced from each other. Particularly, the patterns $P_1$ and $P_2$ are spaced by a distance (or spacing) $S_{12}$, the patterns $P_2$ and $P_3$ are spaced by a distance $S_{23}$, the patterns $P_2$ and $P_4$ are spaced by a distance $S_{24}$, and the patterns $P_3$ and $P_4$ are spaced by a distance $S_{34}$. Further, in this embodiment, the distances $S_{12}$ and $S_{24}$ are smaller than a predetermined distance X, while the distances $S_{23}$ and $S_{34}$ are equal to or greater than the predetermined distance X. X represents the finest or smallest resolution (smallest spacing) that can be achieved by a photolithography process in a given semiconductor fabrication technology generation. In other words, X is the smallest distance between adjacent IC features that can be formed by the photolithography process without shorting these adjacent IC features together. Further information about X is disclosed in commonly-assigned U.S. Pat. No. 8,683,392, the entire disclosure of which is herein incorporated by reference.

At operation 304, the method 300 (FIG. 3A) derives a graph representing the IC design layout. Continuing with the exemplary IC design layout 400, a graph 500 is derived as shown in FIG. 4B. The graph 500 includes vertices connected by edges. The vertices represent the patterns $P_1$ through $P_4$. For the convenience of discussion, the vertices are labeled with the same alphanumeric values as the corresponding patterns. The edges represent those distances that are smaller than X. In this embodiment, the edge $E_{12}$ represents the distance $S_{12}$, and the edge $E_{24}$ represents the distance $S_{24}$. It is noted that the vertex $P_3$ is not connected by any edges because the pattern $P_3$ is sufficiently apart from other patterns. For the convenience of discussion, a "degree" of a vertex refers to the number of edges connected to the vertex. In this example, vertex $P_2$ has a degree of 2, vertices $P_1$ and $P_4$ each have a degree of 1, and the vertex $P_3$ has a degree of 0 (zero).

Figure 5A:
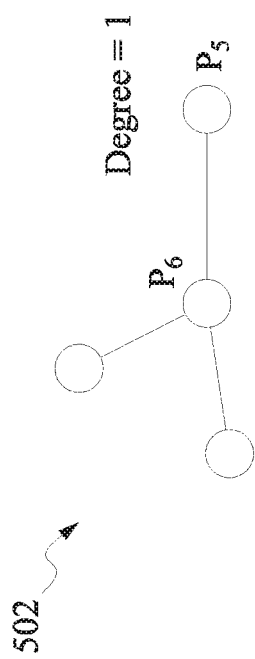
FIGS. 5A and 5B illustrate a method of simplifying a graph for an MP method, in accordance with an embodiment.
Figure 5B:
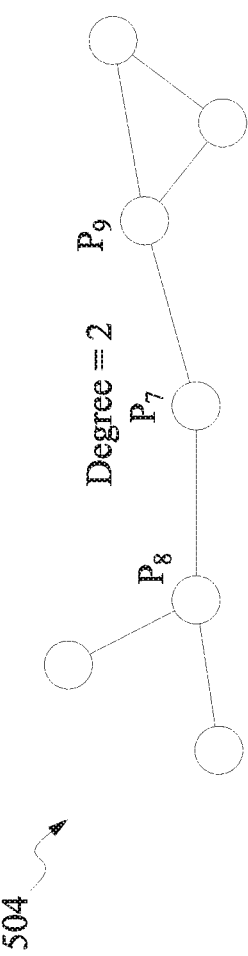

At operation 306, the method 300 (FIG. 3A) simplifies the graph derived by the operation 304. In an embodiment, operation 306 simplifies the graph by removing vertices connected by less than N edges, i.e. having a degree less than N. The rationale is that a vertex with a degree less than N can always be colored in an N-coloring problem. This is illustrated in FIGS. 5A and 5B for 3-coloring problems (N=3, available colors are colors A, B, and C). Referring to FIG. 5A, in a graph 502, a vertex $P_5$ has a degree of 1 and an edge exists between the vertex $P_5$ and a vertex $P_6$. If the vertex $P_6$ can be colored (i.e., a coloring solution exists for $P_6$), then $P_5$ is colorable. For example, if the vertex $P_6$ is colored with color A, then the vertex $P_5$ can be colored with either color B or color C. Therefore, the existence of the vertex $P_5$ does not contribute to the 3-coloring problem for the graph 502, which means that the vertex $P_5$ can be removed from the graph 502. Referring to FIG. 5B, in a graph 504, a vertex $P_7$ has a degree of 2 and connects to vertices $P_8$ and $P_9$. Following the same analysis above, the vertex $P_7$ can be removed from the graph 504 thereby simplifying the graph 504. In the present embodiment, when a vertex is removed from a graph, the edges associated with the vertex are also removed.

In an embodiment, the operation 306 performs the removal of vertices iteratively until either all vertices are removed or all remaining vertices have a degree of N or more. This is illustrated in FIGS. 6A, 6B, and 6C for a 3-coloring problem (N=3). FIG. 6A illustrates a graph 506 with vertices $P_{10}$, $P_{11}$, $P_{12}$, $P_{13}$, and $P_{14}$ having a degree of either 1 or 2 (less than N). FIG. 6B illustrates the graph 506 after the vertices $P_{10}$, $P_{11}$, $P_{12}$, $P_{13}$, and $P_{14}$ have been removed. As shown, vertices $P_{15}$, $P_{16}$, and $P_{17}$ now become removable (having a degree less than N). FIG. 6C illustrates the graph 506 after the vertices $P_{15}$, $P_{16}$, and $P_{17}$ have been removed. Now, all vertices in the graph 506 have a degree of 3 or more.

At operation 308, the method 300 (FIG. 3A) checks whether all vertices have been removed from the graph. If all vertices have been removed by the operation 306 (i.e., the graph becomes empty), then the underlying IC design layout (provided in operation 302) is MP compliant, i.e., the patterns can be allocated onto N photomask layers. For example, the layout 400 (FIG. 4A) and the layouts corresponding to the graphs 502 (FIG. 5A) and 504 (FIG. 5B) are MP compliant for a triple patterning process (N=3). In these cases, the method 300 proceeds to operation 310 to output the results. In embodiments, the format of the results may vary depending on where the method 300 is implemented.

In an embodiment, the method 300 is implemented by the design house 120 (FIG. 2) and the results can be in a form of virtual indicators inserted into the IC design layout 122. The virtual indicators are associated with IC patterns and specify how the IC patterns shall be assigned to photomask layers. Further, the virtual indicators may appear in the computerized layout file(s), but do not actually appear on a photomask. For example, the virtual indicators may be coloring markers in a reference layer of the IC layout. IC patterns having the same coloring marker are to be assigned to the same photomask layer, and IC patterns having different coloring markers are to be assigned to different photomask layers. For another example, the virtual indicators may be properties (e.g., a field, a text, or another property in the IC layout) associated with IC patterns and specify that the IC patterns be assigned to same or different photomask layers. In another embodiment, the virtual indicators are MP assistant features (e.g., polygons) inserted into the IC design layout (more details will be discussed later). In various embodiments, the virtual indicators can take any form that is recognizable by an IC fabrication tool designed for multiple patterning, such as the mask data preparation 132 (FIG. 2).

In another embodiment, the method 300 is implemented by the mask data preparation 132 (FIG. 2) and the results are decomposed patterns for fabricating N photomasks. In an embodiment, operation 310 remembers or learns the vertices removed at each step of the operation 306 and colors the IC patterns in an exact backward order. For example, operation 310 colors the vertices that are removed in the last step of the operation 306, it then colors the vertices that are removed in the penultimate step of the operation 306, and so on, until it colors the vertices that are removed in the first step of the operation 306. After all the vertices have been colored (all the patterns have been assigned a photomask layer), operation 310 outputs each group of the patterns into a file for mask fabrication, as discussed above with reference to FIGS. 1 and 2.

The inventors of the present disclosure have observed that the operation 306 does not always reduce a graph to empty even if the graph is indeed MP compliant in some instances. In such instances, an IC design layout, otherwise eligible for multiple patterning, is rejected by the DRC tool in the design house 120 (FIG. 2) or is rejected by the mask house 130 (FIG. 2). Such rejection may result in further modifications to the layout or additional photomasks for lithography. In either case, an increased cost of design and production is incurred. An example is shown in FIG. 7A in a quadruple patterning process (N=4). Referring to FIG. 7A, a graph 508 is derived from an IC design layout or has been simplified, such as by the operation 306, from another more complex graph. As shown, each vertex in FIG. 7A has a degree of 4 or greater. Seemingly, the IC design layout is not compliant for the quadruple patterning process. But indeed, the graph 508 can be 4-colored, as will be shown later.

The inventors of the present disclosure have further observed that certain IC patterns (or vertices in the corresponding graph) may be assigned to the same photomask layer based on properties of the IC patterns and/or their relationship with their neighboring patterns. For example, some IC patterns belong to a critical path circuit, and it is very desirable to assign them to a single photomask layer so as to minimize overlay errors or other mismatches caused by multiple patterning. For another example, opposite vertices in two abutted triangles can be assigned to the same color (at least for 3-coloring problems). One such example is vertices $P_{18}$ and $P_{19}$ in the graph 508 (FIG. 7A). Two abutted triangles $\Delta P_{18}P_{20}P_{26}$ and $\Delta P_{19}P_{20}P_{26}$ share the edge $P_{20}P_{26}$. The vertices $P_{18}$ and $P_{19}$ are the opposite vertices in the two abutted triangles. Similarly, the vertices $P_{18}$ and $P_{19}$ are the opposite vertices in the two abutted triangles $\Delta P_{18}P_{20}P_{21}$ and $\Delta P_{19}P_{20}P_{21}$, and in the two abutted triangles $\Delta P_{18}P_{21}P_{26}$ and $\Delta P_{19}P_{21}P_{26}$. Therefore, the vertices $P_{18}$ and $P_{19}$ can be assigned the same color. When two or more vertices are assigned the same color, the two or more vertices are merged (more details are shown later), which in turn reduces the degrees of the vertices that are directly connected to the two or more vertices (referred to as the neighboring vertices in the present disclosure). Therefore, by merging certain vertices, a seemingly MP-incompliant IC design layout may be led to an MP-eligible solution.

In an embodiment, two vertices may be assigned to the same color (the corresponding patterns can be assigned to a single photomask layer) when the two vertices are not directly linked (i.e. not directly connected by an edge). In a further embodiment, two vertices may be assigned to the same color when: (1) the two vertices are not directly linked, (2) the two vertices share one or more neighboring vertices, and (3) at least one of the neighboring vertices currently has a degree of N. Therefore, by merging the two vertices, the degree of the neighboring vertex can be reduced to less than N, which means the neighboring vertex can be removed by the operation 306, leading to further reduction in the graph. In another embodiment, each of the to-be-merged vertices is currently connected by N edges to other vertices.

Referring back to FIG. 3A, in the present embodiment, when the operation 306 does not fully reduce a graph (such as the graph 508 in FIG. 7A), the method 300 proceeds from the operation 308 to operation 312. At the operation 312, the method 300 selects vertices for merging. In various embodiments, the vertices may be selected based on the discussion above. In another embodiment, when the graph is smaller than a certain size (e.g., the number of vertices in the graph is smaller than a threshold), the operation 312 may try all possible combinations of color assignment to the vertices until a solution is found, or until it fails to find a solution after exhausting all possible combinations (in this case, the design layout is indeed incompliant for MP and the design layout may be modified by design engineers to address the concerns). If a solution is found, the operation 312 may mark certain vertices with the same color or specify that certain vertices be merged.

At operation 314, the method 300 (FIG. 3A) merges the vertices selected (or otherwise marked as merge-able) by the operation 312. As illustrated in FIG. 7B, the vertices $P_{18}$ and $P_{19}$ are merged (considered as one entity for subsequent MP DRC or MP decomposition processes) and the merged vertex has a new degree of 5. As a result of the merging, the neighboring vertices $P_{20}$, $P_{21}$, and $P_{26}$ each reduce its respective degree by 1. Now, the vertices $P_{20}$, $P_{21}$, and $P_{26}$ have degrees of 3, 3, and 6 respectively. Similarly, the vertices $P_{22}$ and $P_{23}$ are merged and the neighboring vertices $P_{24}$, $P_{25}$, and $P_{27}$ each reduce its respective degree by 1. Even though the selecting and the merging with reference to FIG. 7B involve pairs of vertices, in practice, the operations 312 and 314 may be applied to two or more vertices as a group.

In an embodiment, the merging of two vertices is accomplished by inserting an MP assistant feature into the IC design layout (operation 314a in FIG. 3B). One example is shown in FIG. 8A. Referring to FIG. 8A, MP assistant features 552 and 554 are inserted into the IC design layout corresponding to the graph 508. The MP assistant features 552 and 554 are polygons in this embodiment. Further, they appear in the computerized layout file, but do not actually appear on a photomask. The presence of the MP assistant features 552 and 554 indicates that the layout patterns represented by the vertices $P_{18}$ and $P_{19}$ are to be assigned to the same photomask layer (first photomask layer) and that the layout patterns represented by the vertices $P_{22}$ and $P_{23}$ are to be assigned to the same photomask layer (second photomask layer). It is noted that the first and second photomask layers can be the same photomask layer or different photomask layers. In an embodiment, the MP assistant features 552 and 554 are added to the layout by the design house 120 (FIG. 2). For example, the MP assistant feature 552 (554) may be disposed between the layout patterns represented by the vertices $P_{18}$ and $P_{19}$ ($P_{22}$ and $P_{23}$) and may come into physical contact with the respective layout patterns. In another example, the MP assistant features 552 and 554 may be spaced slightly apart from the respective layout patterns on either side. In an embodiment, the MP assistant features 552 and 554 partially cover the respective layout patterns. In another embodiment as shown in FIG. 8B, the MP assistant features 552 and 554 fully cover the respective layout patterns. Various other embodiments of inserting MP assistant features are possible.

Figure 8D:
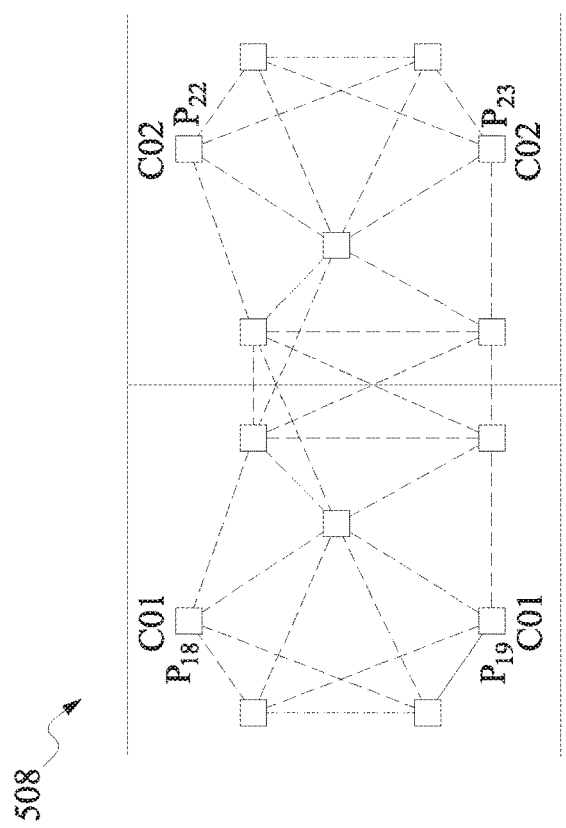
Figure 8C:
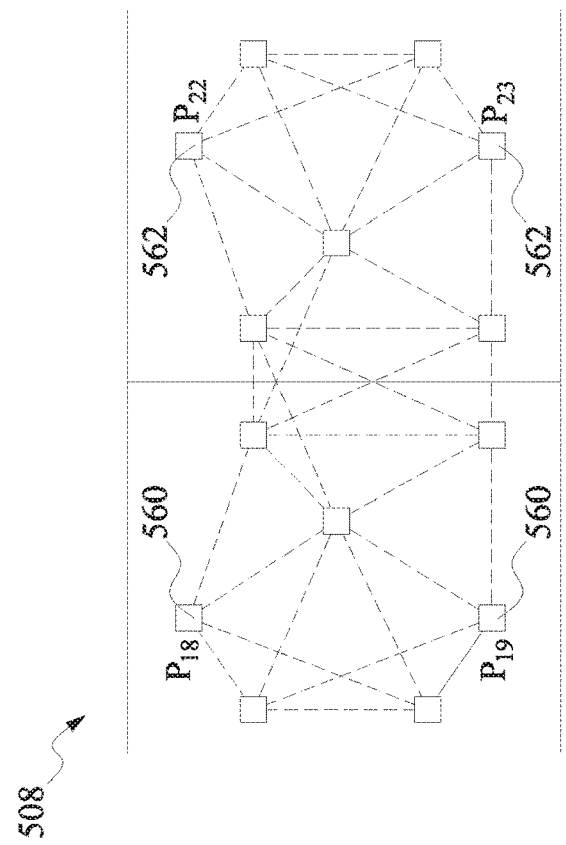

In another embodiment, the merging of two vertices is accomplished by inserting coloring markers in a reference layer of the design layout or by modifying existing coloring markers in a reference layer of the design layout (operation 314b in FIG. 3B). This is illustrated in FIG. 8C. Referring to FIG. 8C, the vertices (or design patterns) $P_{18}$ and $P_{19}$ are assigned the same coloring marker 560, while vertices (or design patterns) $P_{22}$ and $P_{23}$ are assigned the same coloring marker 562. The coloring markers 560 and 562 are present in a reference layer separate from the layer where the design patterns $P_{18}$, $P_{19}$, $P_{22}$, and $P_{23}$ are drawn. In an embodiment, the reference layer is processed by a tool (such as the MP DRC 124 or the Pattern Decomposition 134) and signifies to the tool that the patterns having the same coloring marker are to be assigned to a single photomask layer.

In yet another embodiment, the merging of two vertices is accomplished by adding a text as a property of the respective design pattern or by modifying an existing text field associated with the respective design pattern (operation 314c in FIG. 3B). This is shown in FIG. 8D. Referring to FIG. 8D, the design patterns $P_{18}$ and $P_{19}$ are associated with a text indicating that they are assigned the same color C01, while the design patterns $P_{22}$ and $P_{23}$ are associated with a text indicating that they are assigned the same color C02. In various embodiments, the colors C01 and C02 may be the same or different colors. The texts may be present in the same layer as the respective design patterns, or they may be present in a different layer. In an embodiment, the respective texts are processed by a tool (such as the MP DRC 124 or the Pattern Decomposition 134) and signify to the tool that the associated patterns are to be assigned to a single photomask layer.

Figure 7E:
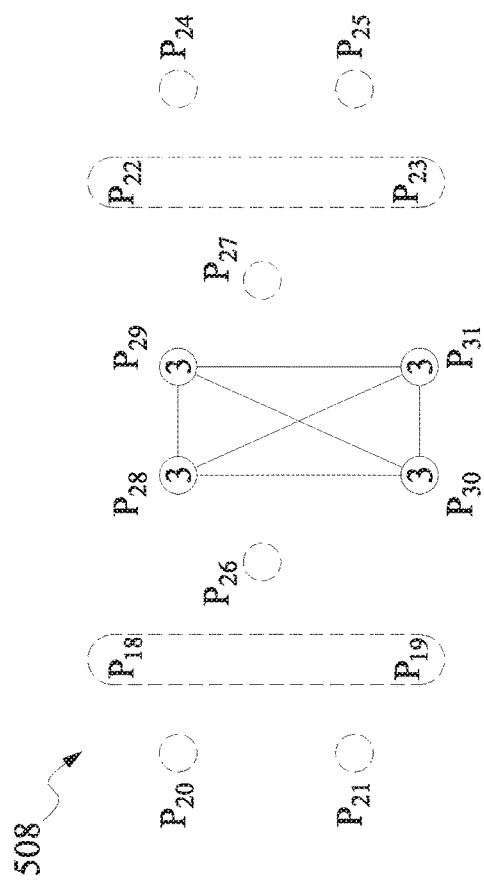
Figure 7F:
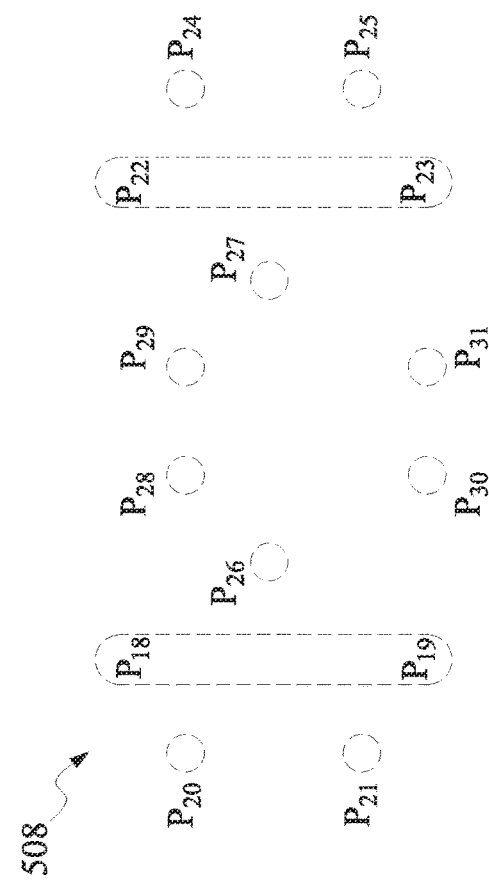

Referring back to FIG. 3A, after having merged the appropriate vertices, the method 300 goes back to the operation 306 to perform further graph reduction. As shown in FIG. 7B, the vertices $P_{20}$, $P_{21}$, $P_{24}$, and $P_{25}$ can be removed because each of them has a degree of 3 which is less than N=4. FIG. 7C, shows the results after the vertices $P_{20}$, $P_{21}$, $P_{24}$, and $P_{25}$ are removed from the graph 508. Due to the removal of the vertices $P_{20}$, $P_{21}$, $P_{24}$, and $P_{25}$ and the associated edges, the merged vertex $P_{18}P_{19}$ and the merged vertex $P_{22}P_{23}$ now each have a degree of 3 and can be removed. FIG. 7D shows the results after the merged vertex $P_{18}P_{19}$ and the merged vertex $P_{22}P_{23}$ are removed from the graph 508, which indicate that the vertices $P_{26}$ and $P_{27}$ can be removed in a next step. FIG. 7E shows the results after the vertices $P_{26}$ and $P_{27}$ are removed, which indicates that the vertices $P_{28}$, $P_{29}$, $P_{30}$, and $P_{31}$ can be removed. FIG. 7F shows that all vertices are removed from the graph 508. In another word, the IC design layout represented by the graph 508 is compliant for MP processing (N=4, a quadruple patterning in this case). The method 300 (FIG. 3A) then proceeds to the operation 310 to output the results. In an embodiment, the coloring of the vertices (operation 310) tracks the operation 306 backward. For example, the vertices $P_{28}$, $P_{29}$, $P_{30}$, and $P_{31}$ are colored first, then the vertices $P_{26}$ and $P_{27}$, then the vertices $P_{18}$, $P_{19}$, $P_{22}$, and $P_{23}$, and finally the vertices $P_{20}$, $P_{21}$, $P_{24}$, and $P_{25}$ are colored.

In embodiments, the method 300 (FIG. 3A) may repeat the loop (operations 306, 308, 312, and 314) iteratively until a solution is found. It is noted that since N-coloring problem (N>2) is NP-complete, for a given design layout, the method 300 may or may not find a solution within a given computation time and/or resource limit. In embodiments, a computation budget may be implemented in the design house 120 or the mask house 130 (FIG. 2) based on design cost considerations. For example, when the method 300 fails to reach a conclusion within the budget, the design layout may be modified (e.g., operation 126 in FIG. 2) before further attempts.

Referring now to FIG. 9, shown therein is an illustrative computerized IC tool 600 for implementing embodiments of the method 300 described above. The computerized IC tool 600 may be a design tool (e.g., a DRC tool) used by the design house 120 or a mask data preparation tool used by the mask house 130 (FIGS. 1 and 2). The computerized IC tool 600 includes a microprocessor 602, an input device 604, a storage device 606, a video controller 608, a system memory 610, a display 614, and a communication device 616, all interconnected by one or more buses 612. The storage device 606 could be a floppy drive, hard drive, CD-ROM, optical drive, or any other form of storage device. In addition, the storage device 606 may be capable of receiving a floppy disk, CD-ROM, DVD-ROM, or any other form of computer-readable medium. In one example, the input device 604 and the storage device 606 collectively receive a design layout (e.g., the design layout 122a or 122 in FIG. 2). In an embodiment, the storage device 606 may contain computer-executable instructions which, when read by the microprocessor 602, cause the microprocessor 602 to perform the method 300 as discussed above. Further, the communication device 616 could be a modem, network card, or any other device to enable the IC tool 600 to communicate with other tools.

The computerized IC tool 600 may implement the method 300 using hardware, software, or a combination thereof. Exemplary hardware includes processor-capable platforms, such as personal computers or servers, and hand-held processing devices such as smart phones, tablets, and personal digital assistants. Further, hardware may include other physical devices that are capable of executing machine-readable instructions, such as field programmable gate array (FPGA) and application specific integrated circuits (ASIC). Software includes any machine code stored in any memory medium, such as RAM or ROM, and machine code stored on other devices (such as floppy disks, flash memory, or a CD ROM, for example). Software may include source or object code, for example. In addition, software encompasses any set of instructions capable of being executed in a client machine or server.

Combinations of software and hardware could also be used for providing enhanced functionality and performance for certain embodiments of the present disclosure. One example is to directly manufacture software functions into a silicon chip such as an FPGA or an ASIC. Accordingly, it should be understood that combinations of hardware and software are also included within the definition of the computerized IC tool 600 and are thus envisioned by the present disclosure as possible equivalent structures and equivalent methods.

Computer-readable mediums in the present disclosure include passive data storage, such as a random access memory (RAM) as well as semi-permanent data storage such as a compact disk read only memory (CD-ROM). In addition, an embodiment of the present disclosure may be embodied in the RAM of a computer to transform a standard computer into the computerized IC tool 600.

The computerized IC tool 600 may be designed to work on any specific architecture. For example, the computerized IC tool 600 may be designed to work on a single computer, local area networks, client-server networks, wide area networks, internets, hand-held and other portable and wireless devices and networks.

Although not intended to be limiting, the present disclosure provides many benefits to semiconductor manufacturing processes. For example, embodiments of the present disclosure may be implemented for multiple patterning (MP) processes where an IC design layout (or a layer of an IC design layout) is decomposed into three or more subsets with each subset being fabricated into a photomask. The MP processes may be utilized in cases where traditional lithography or double patterning lithography is not enough to meet the demand of increased pattern density. In embodiments of the present disclosure, by merging vertices (assigning a same color to patterns), certain design layouts can be processed efficiently for MP compliance check or for MP decomposition. According to embodiments of the present disclosure, methods of merging the vertices may be implemented using virtual indicators (e.g., MP assistant features, coloring markers, and MP text fields) that can be easily integrated into existing design and fabrication flow.

In one exemplary aspect, the present disclosure is directed to a method of fabricating an integrated circuit (IC). The method includes providing a layout of the IC, the layout having a set of IC features; and deriving a graph from the layout, the graph having vertices connected by edges, the vertices representing the IC features, and the edges representing spacing between the IC features. The method further includes selecting at least two vertices, wherein the selected vertices are not directly connected by an edge, and the selected vertices share at least one neighboring vertex that is connected by N edges, where N is greater than two. The method further includes merging, using a computerized IC tool, the selected vertices. The merging reduces a number of edges connecting the neighboring vertex to be below N. The method further includes removing a portion of the vertices that are connected by less than N edges.

In another exemplary aspect, the present disclosure is directed to a method of fabricating an integrated circuit (IC). The method includes providing a layout of the IC having a set of IC features; and decomposing, using a computerized IC tool, the set of IC features into N subsets of IC features such that each of the N subsets is assigned to a respective photomask layer for lithography, wherein N is greater than two. In an embodiment, the decomposing includes deriving a graph from the layout, the graph having vertices connected by edges, the vertices representing the IC features, and the edges representing spacing between the IC features. The decomposing further includes removing a portion of the vertices that are connected by less than N edges; and selecting at least two vertices, wherein the at least two vertices are not directly connected by an edge, and the at least two vertices share at least one neighboring vertex that is connected by N edges. The decomposing further includes merging the at least two vertices, thereby reducing a number of edges connecting the neighboring vertex to be below N. The decomposing further includes repeating the removing, the selecting, and the merging until all vertices of the graph are removed.

In another exemplary aspect, the present disclosure is directed to a method of fabricating an integrated circuit (IC). The method includes providing a layout of the IC, the layout having a set of IC features. The method further includes checking, using a computerized IC tool, if the set of IC features are suitable for multiple patterning with N photomask layers for lithography, wherein N is greater than two. In an embodiment, the checking includes deriving a graph from the layout, the graph having vertices connected by edges, the vertices representing the IC features, and the edges representing spacing between the IC features that are smaller than a threshold. The checking further includes removing a portion of the vertices that are connected by less than N edges. The checking further includes selecting at least two vertices, wherein the selected vertices are not connected by an edge, and the selected vertices share at least one neighboring vertex that is connected by N edges. The checking further includes merging the selected vertices, thereby reducing a number of edges connecting the neighboring vertex to be below N, wherein the merging includes inserting a virtual indicator to the layout, the virtual indicator designating that IC features represented by the selected vertices are to be assigned to a single photomask layer. The checking further includes repeating the removing, the selecting, and the merging until all vertices of the graph are removed.

The foregoing outlines features of several embodiments so that those of ordinary skill in the art may better understand the aspects of the present disclosure. Those of ordinary skill in the art should appreciate that they may readily use the present disclosure as a basis for designing or modifying other processes and structures for carrying out the same purposes and/or achieving the same advantages of the embodiments introduced herein. Those of ordinary skill in the art should also realize that such equivalent constructions do not depart from the spirit and scope of the present disclosure, and that they may make various changes, substitutions, and alterations herein without departing from the spirit and scope of the present disclosure.

What is claimed is:

1. A method of fabricating an integrated circuit, comprising the steps of:
   receiving a layout that includes a set of circuit features; and
   assigning the set of circuit features to a plurality of lithographic masks by:
      representing each feature of the set of circuit features as a vertex;
      representing spacings between the set of circuit features as edges extending between the vertices;
      merging a first vertex corresponding to a first feature of the set of circuit features with a second vertex corresponding to a second feature of the set of circuit features based on the first vertex and the second vertex being not directly connected to each other but both directly connected to another vertex, thereby reducing a degree of the another vertex;

assigning the first feature and the second feature to a first mask of the plurality of lithographic masks based on the merging of the first vertex and the second vertex; and fabricating the plurality of lithographic masks.

2. The method of claim 1, wherein each edge represents a spacing between corresponding circuit features that is less than a threshold.

3. The method of claim 1, wherein the merging includes modifying the layout by adding a virtual indicator that designates that the first feature and the second feature are assigned to a single mask.

4. The method of claim 3, wherein the single mask corresponds to the first mask.

5. The method of claim 3, wherein the virtual indicator includes an assistant feature in the layout disposed between the first feature and the second feature, and wherein the assistant feature does not appear in the plurality of lithographic masks.

6. The method of claim 3, wherein the virtual indicator includes a coloring marker in a reference layer of the layout.

7. The method of claim 3, wherein the virtual indicator includes text associated with the first feature and the second feature.

8. The method of claim 1 further comprising:

removing a third vertex corresponding to a third feature of the set of circuit features based on the third vertex being connected by a number of edges less an edge threshold, wherein the edge threshold equals to a total number of lithographic masks in the plurality of lithographic masks and the third feature is different from the first and the second features; and assigning the third feature to a second mask of the plurality of lithographic masks based on the removing of the third vertex.

9. The method of claim 8, wherein the removing of the third vertex includes removing each edge connected to the third vertex.

10. The method of claim 1, wherein the first vertex has a degree of N which is equal to a total number of lithographic masks in the plurality of lithographic masks.

11. The method of claim 1, wherein both the first and the second vertices have a degree of N which is equal to a total number of lithographic masks in the plurality of lithographic masks.

12. A method comprising:

providing a layout of an integrated circuit, the layout having a set of circuit features; and decomposing the set of circuit features into a plurality of subsets, each subset corresponding to a lithographic mask of a plurality of lithographic masks, wherein the decomposing includes:

deriving a graph from the layout, the graph having vertices connected by edges, the vertices each representing a feature of the set of circuit features, and the edges representing spacing between features;

merging a first vertex and a second vertex of the graph based on the first vertex and the second vertex sharing at least one neighbor vertex that has a degree of N, thereby reducing the degree of the neighbor vertex, where N is a total number lithographic masks in the plurality of lithographic masks, wherein the merging assigns a first circuit feature of the set of circuit features associated with the first vertex and a second circuit feature of the set of circuit features associated with the second vertex to a first lithographic mask of the plurality of lithographic masks; and fabricating the plurality of masks.

13. The method of claim 12, wherein each of the edges represents that a spacing between corresponding circuit features is less than a minimum spacing.

14. The method of claim 12, wherein the merging of the first vertex and the second vertex is further based on the first vertex not being directly connected to the second vertex by an edge.

15. The method of claim 12, wherein the merging includes adding an indicator to the layout that indicates that the first circuit feature and the second circuit feature are assigned to the first lithographic mask.

16. The method of claim 12 further comprising:

removing a third vertex and a set of edges connected to the third vertex from the graph based on a count of the set of edges being less than N; and assigning a third feature to the plurality of lithographic masks based on the removing of the third vertex.

17. A method of fabricating an integrated circuit comprising:

providing a layout of the integrated circuit, the layout having a set of features corresponding to a single layer of the layout;

determining whether the set of features are suitable for dividing among a plurality of lithographic masks, wherein the determining includes:

deriving a graph from the layout, the graph having vertices connected by edges, the vertices each representing a feature of the set of features, and the edges representing spacings between features that are smaller than a spacing threshold; and merging a first vertex and a second vertex of the vertices based on the first vertex and the second vertex not being directly connected and sharing at least one neighbor vertex, thereby reducing a degree of the neighbor vertex, wherein the merging includes inserting an indicator in the layout designating that a first feature associated with the first vertex and a second feature associated with the second vertex are assigned to a first mask of the plurality of lithographic masks; and fabricating the plurality of lithographic masks.

18. The method of claim 17, wherein the indicator includes an assistant feature disposed between the first feature and the second feature, and wherein the assistant feature does not appear in the plurality of lithographic masks.

19. The method of claim 17, wherein the indicator includes a marker in a reference layer of the layout.

20. The method of claim 17, wherein the indicator includes text associated with the first feature and the second feature.

* * * * *